ARRANGEMENT FOR PRODUCING ASYMMETRIC BIPOLAR PULSES
Filed Dec. 9, 1964
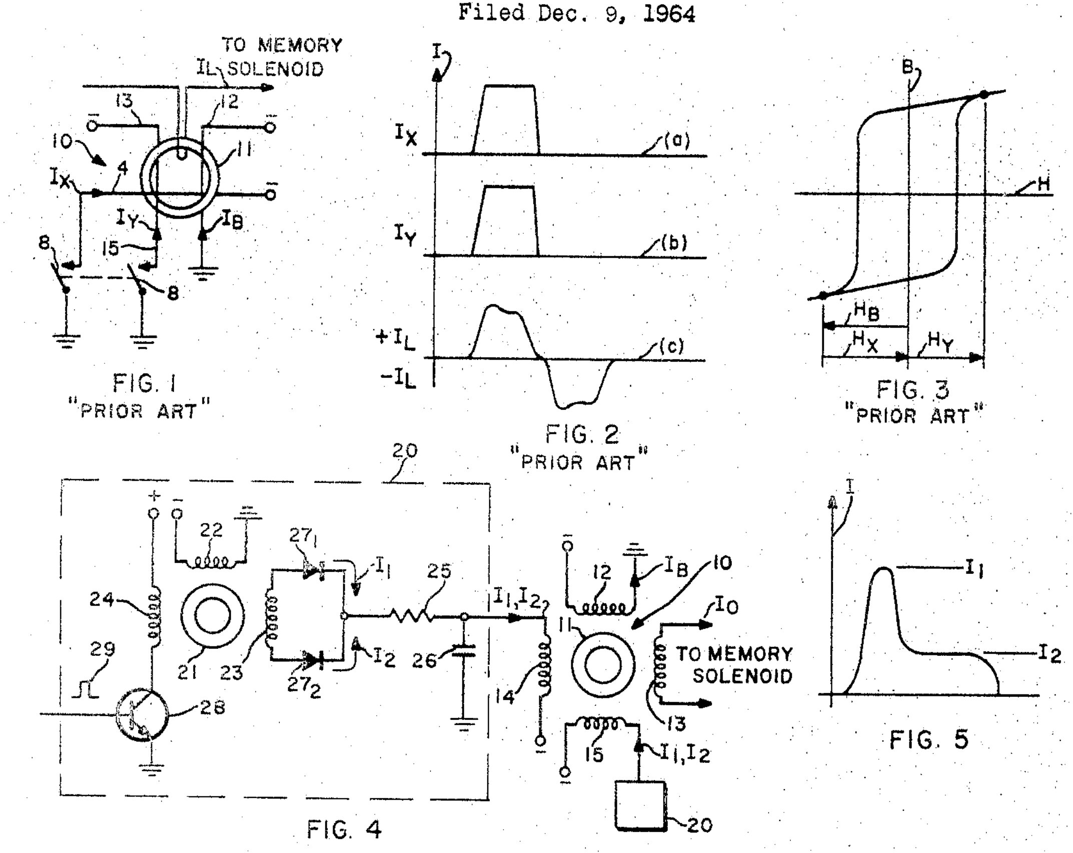
FIG. 1 "PRIOR ART", FIG. 2 "PRIOR ART", FIG. 3 "PRIOR ART", FIG. 4, FIG. 5
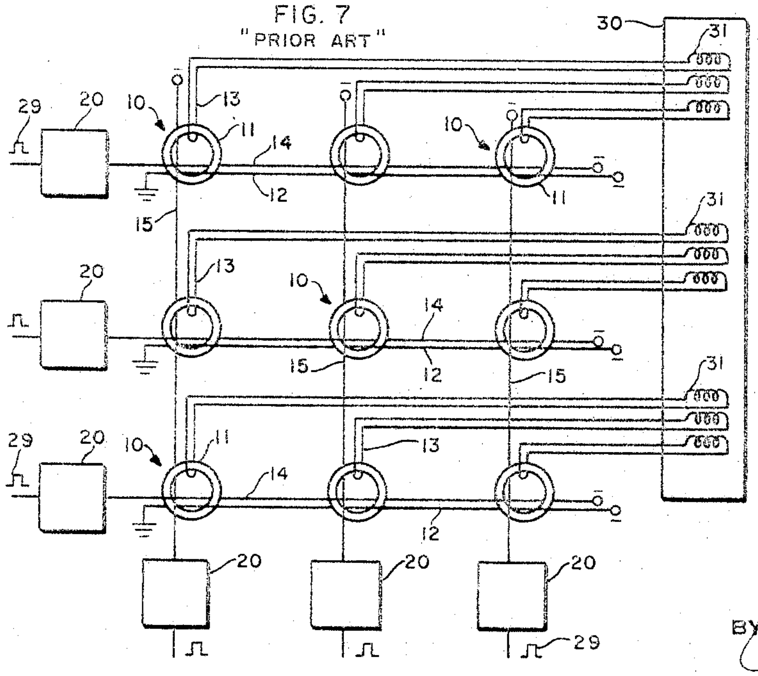
FIG. 7 "PRIOR ART"
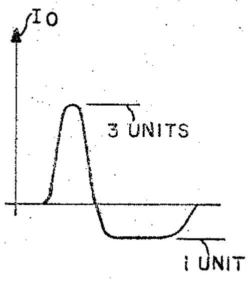
FIG. 6
INVENTOR
KAZIMIERZ J. DEPTUCH
BY [signature]
ATTY.

United States Patent Office 3,427,467
Patented Feb. 11, 1969

3,427,467

ARRANGEMENT FOR PRODUCING ASYMMETRIC BIPOLAR PULSES

Kazimierz J. Deptuch, Chicago, Ill., assignor to Automatic Electric Laboratories, Inc., Northlake, Ill., a corporation of Delaware Filed Dec. 9, 1964, Ser. No. 417,078
U.S. Cl. 307—88 12 Claims
Int. Cl. H03k 3/51

This invention relates to apparatus for producing bipolar pulses and in particular to apparatus for producing asymmetric bipolar pulses.

Some memory systems employ the well known D-C biased matrix as a means of accessing the information store. Usually the matrix comprises a plurality of cores, each of which has a rectangular hysteresis characteristic, and each of which is normally biased to one of the stable magnetic states that are defined by the hysteresis characteristic. The well known coincident current technique is employed to switch a core from its biased state to the opposite state, the core then returning to its biased state. A sense winding detects these flux reversals and provides a bipolar driving signal to its associated memory drive line. The drive signal is substantially symmetric whereby the first polarity (hereinafter called the read pulse) of the signal is of the same magnitude as the following opposite polarity (hereinafter called the reset or write pulse).

With advancement in the art, some memory systems require bipolar signals that are asymmetric in pulse magnitude. One such current requirement can be seen in the United States patent application of J. G. Valassis, Ser. No. 239,555 filed Nov. 23, 1962, now Patent No. 3,308,447, and assigned to the same assignee as the present invention. The present invention addresses itself to improving D-C biased matrices for accessing memory stores and is explained below as an improvement to memory systems. However, this is by way of illustrative example only and should not serve to limit the scope of the invention.

Accordingly, it is the primary object of the invention to provide new and improved apparatus for producing bipolar signals.

Another object of the invention is to provide new and improved apparatus for producing asymmetric bipolar signals.

Still another object of the invention is to provide improved techniques and apparatus for accessing D-C biased matrices.

A feature of the invention resides in the use of a magnetic core device and full-wave rectifier means to provide a unidirectional bilevel signal for energizing a magnetic core.

These and other objects and features will become apparent and the invention will be best understood from the following description taken in conjunction with the accompanying drawings.

In the drawings:

FIGS. 1, 2 and 3 schematically describe one core of a well known D-C biased matrix;

FIG. 4 is a circuit diagram of an embodiment of the invention;

FIGS. 5 and 6 are current waveforms of the arrangement of FIG. 4; and

FIG. 7 describes the embodiment of FIG. 4 as it would apply to a selection matrix.

FIG. 1 describes a single selection core device 10 comprising a magnetic core 11 which is normally biased to one of its two stable states via winding 12. Windings 14 and 15 are effective, in coincidence, to reverse the magnetic state of core 11 upon closure of switch 8. Output winding 13 senses reversals of magnetic state. FIGS. 2 and 3 describe the operation of the apparatus of FIG. 1 for a closing and an opening of the switch. It can be seen that one "access" of core 11 will deliver a symmetrical driving pulse to apparatus which is connected to winding 13. Since the above is well known in the art, no further explanation is needed.

FIG. 4 describes an arrangement 20 which may be employed to drive apparatus with an asymmetric signal. The arrangement comprises a magnetic core 21 having a bias winding 22 connected to a suitable energy source and effective to place core 21 in one of its two stable states. An input winding 24 is connected between an energy source and ground via switch means, in this case transistor 28. Winding 23 serves as the output winding for core 21. Winding 23 has a tap to ground and its end terminals connected to a full-wave rectifier including diodes 27, and 27$_2$. A filter, including elements 25 and 26 connects the full-wave rectifier to winding 14 of the core device described in FIG. 1. A similar arrangement is connected to winding 15.

FIG. 7 describes essentially the same apparatus as FIG. 4 in matrix form and connected to a memory. In FIG. 7 windings 12, 14 and 15 have been serially connected according to column and row arrangement of cores 11. Windings 13 are individually connected to windings 31 of the memory 30 (shown only schematically).

Referring to FIG. 4, assume that an access signal 29 is impressed on the base of transistor 28. Transistor 28 turns on completing a current path through winding 24 to ground. The magnetic field developed by winding 24 is sufficient to overcome the bias effected by winding 22 and switch core 21 from its normal (biased) magnetic state to the opposite magnetic state. At the end of pulse 29 transistor 28 opens the circuit, thus ending the magnetic effect of winding 24. The bias condition is again effective as the core reverts to the biased state. Similar action is occurring in the apparatus connected to winding 15 of core 11.

The rate of reswitching core 21 is controlled by the D-C bias effected at winding 22 which is regulated to be slower than the original switching. This causes an asymmetric signal to be sensed at winding 23; therefore, the currents $I_1$, $I_2$ flowing through diodes 27$_1$, 27$_2$ produce upon full-wave rectification a unidirectional bilevel signal (FIG. 5).

The current amplitude $I_1$, after filtering, is such to provide half-select access of core 11 when coincident current techniques are employed; otherwise $I_1$ can provide full-select access of core 11. The amplitude $I_2$, by partially opposing the D-C bias of winding 12, regulates the resetting rate of core 11. Therefore, amplitude $I_1$ controls the amplitude of the first portion of the output signal sensed by winding 13, and amplitude $I_2$ controls the second portion of the output signal. The output (FIG. 6) is therefore asymmetric and bipolar.

The net ampere turns into core 11 are:

$$2N_{14}\,I_1-N_{12}I_B$$

where $$I_{14}=I_{15}I_1$$

and $$N_{12}I_B-2N_{14}I_2$$

where $$I_{14}=I_{15}I_2$$

Turning to FIG. 7 it can be seen that the access signals 29 of a selection matrix can be translated by the apparatus 20 to produce asymmetric bipolar signal memory solenoids.

In an experimental construction, an output signal having a read portion of 600 milliamperes and a reset portion of 190 milliamperes was obtained.

Some of the advantages of the present arrangement are:

A conventional D-C biased matrix can produce asymmetric bipolar pulses of almost any amplitude variation;

A simple means of varying the D-C bias of a selected core is provided without affecting the bias of the remainder of the cores in a matrix; and A simpler and more economical variation of D-C bias is provided over varying the bias current.

Many changes and modifications may be made by one skilled in the art without departing from the spirit and scope of the invention, and should be included in the appended claims.

What is claimed is:

1. Apparatus for producing an asymmetric bipolar signal, said apparatus comprising means for generating a unipolar bilevel signal, and means including a two-state magnetic device and operated in response to said bilevel signal to generate said bipolar signal.

2. Apparatus for producing an asymmetric bipolar signal, said apparatus comprising first means for generating a unidirectional bilevel signal, second means for generating a unidirectional bilevel signal; and means connected to said two generated means for generating said asymmetric bipolar signal in response to said two bilevel signals.

3. Apparatus for producing an asymmetric bipolar signal, said apparatus comprising first means including a two-state magnetic device, an input signal, said first means being operated by said input signal to generate a bilevel signal, second means including a two-state magnetic device, another input signal, said second means being operated by said other input signal to generate another bilevel signal, and means including a two-state magnetic device, said magnetic device being operated by said bilevel signals to generate said asymmetric bipolar signal.

4. Apparatus for producing an asymmetric bipolar signal, said apparatus comprising first means including a two-state magnetic device and rectifier means, a first input signal, said first means being operated by said first input signal to generate a unidirectional bilevel signal, second means including a two-state magnetic device and rectifier means, a second input signal, said second means being operated by said second input signal to generate a unidirectional bilevel signal, and means including a two-state magnetic device, said magnetic device being operated by said two unidirectional bilevel signals, in coincidence, to generate said asymmetric bipolar signal.

5. Apparatus for producing an asymmetric bipolar signal, said apparatus comprising first means including a two-state magnetic core and rectifier means and filter means, a first input signal, said first means being operated by first input signal to generate a unidirectional bilevel signal, second means including a two-state magnetic core and rectifier means and filter means, a second input signal, said second means being operated by said second input signal to generate a unidirectional bilevel signal, and third means including a two-state magnetic core, said magnetic core being operated by said two bilevel signals in coincidence to generate said asymmetric bipolar signal.

6. Apparatus for producing an asymmetric bipolar signal, said apparatus comprising first means adapted to receive an input signal and operated thereby to generate a unidirectional bilevel signal, said first means including a two-state magnetic core means, full-wave rectifier means connected to said magnetic core means and filter means connected to said rectifier means, second means adapted to receive an input signal and operated thereby to generate a unidirectional bilevel signal, said second means including two-state magnetic core means, full-wave rectifier means connected to said magnetic core means and filter means connected to said rectifier means, and third means including magnetic core means adapted to receive said two unidirectional bilevel signals and operated thereby to generate an asymmetric bipolar signal.

7. Apparatus for producing an asymmetric bipolar signal, said apparatus comprising a first two-state magnetic device, said first device adapted to receive an input signal and operated thereby to generate a first bipolar signal, means to rectify said first bipolar signal, means to filter the rectified first signal, a second two-state magnetic device adapted to receive an input signal and operated thereby to generate a second bipolar signal, means to rectify said second bipolar signal, means to filter the rectified second signal, a third two-state magnetic device adapted to receive said two rectified signals, said third device including a two-state magnetic core and an output, the state of said magnetic core being controlled by said two rectified signals to produce said asymmetric bipolar signal at said output.

8. Appartus for producing an asymmetric bipolar signal, said apparatus comprising first two-state magnetic core means normally conditioned to one of said two states, input means for said first core means to control reversals of magnetic state, output means, including full-wave rectifier means and filter means, to indicate changes of state as unidirectional signals, a second two-state magnetic core means normally conditioned to one of said two states, input means for said second core means to control reversal of magnetic state simultaneously with the state reversals of said first core means, output means for said second core means, including full-wave retifier means and filter means, to indicate changes of magnetic state as unidirectional signals, third two-state magnetic core means normally conditioned to one of said two states, input means for said third core means to coincidently receive said unidirectional signals, and an output for said third core means, said third core means being operated by said unidirectional bilevel signals to produce an asymmetric bipolar signal at said output.

9. Apparatus for producing an asymmetric bipolar signal, said apparatus comprising first and second magnetic core means each having two stable magnetic states and each including an input winding, an output winding and bias means normally conditioning said core means to one of said two stable states; input signals in coincidence for each said input winding, each of said first and second core means being operated by an input signal and the normal bias to produce a bipolar signal at said two outputs; full-wave rectifier means connected to said two outputs to provide unidirectional bilevel signals; and third magnetic core means having a pair of stable states and including bias means normally conditioning said third core means to one of said stable states, first and second input windings connected to said full-wave rectifier means, and an output winding, said third magnetic core means being operated by said two unidirectional bilevel signals in coincidence, to produce at said output an asymmetric bipolar signal.

10. In a memory system including a plurality of solenoids, a plurality of magnetic cores individually associated with each said solenoid, a plurality of access lines for each said magnetic core, a source of unidirectional monolevel access signals for each said access line, and means for coincidentally applying the access signals of a core to its corresponding access lines, the improvement comprising the provision of means in each said access line for translating said unidirectional monolevel access signal into a unidirectional bilevel access signal, a selected core being energized by the translated access signals to produce an asymmetric bipolar signal for its associated solenoid.

11. In a memory system, the combination as claimed in claim 10, wherein said access signal translating means comprises magnetic core means adapted to provide a bipolar signal in response to a unidirectional monolevel access signal, and means for full-wave rectifying said bipolar signal to provide said unidirectional bilevel signal.

12. In a memory system, the combination as claimed in claim 11, wherein said translating means comprises means for filtering the rectified signal.

(References on following page)

References Cited

UNITED STATES PATENTS

| | | | |
|---|---|---|---|
| 3,027,547 | 3/1962 | Froehlich | 340—174 |
| 3,129,336 | 4/1964 | Constantine | 307—88 |
| 3,296,600 | 1/1967 | Einsele | 340—174 |

BERNARD KONICK, *Primary Examiner.*

J. F. BREIMAYER, *Assistant Examiner.*

U.S. Cl. X.R.

340—174